United States Patent [19]

Holly

[11] Patent Number: 4,950,326
[45] Date of Patent: Aug. 21, 1990

[54] PROCESS FOR REMOVAL OF DISSOLVED COPPER FROM SOLUTION

[75] Inventor: Jerry D. Holly, Hillsboro, Oreg.

[73] Assignee: Tektronix, Inc., Beaverton, Oreg.

[21] Appl. No.: 345,865

[22] Filed: May 1, 1989

[51] Int. Cl.$^5$ .............................................. C22B 3/46
[52] U.S. Cl. .............................. 75/726; 204/DIG. 13; 210/759; 210/912
[58] Field of Search ......................... 75/108, 109, 117; 266/170; 204/DIG. 13; 210/759, 912

[56] References Cited

U.S. PATENT DOCUMENTS

| | | | |
|---|---|---|---|
| 3,666,447 | 5/1972 | Saubestre | 75/108 |
| 3,674,466 | 4/1972 | Anderson | 75/109 |
| 4,082,546 | 4/1978 | Wallace | 75/109 |
| 4,092,154 | 5/1978 | Dietz, Jr. | 75/109 |
| 4,420,401 | 12/1983 | Kretas | 75/109 |
| 4,450,002 | 5/1984 | Durkee | 75/109 |
| 4,512,900 | 4/1985 | Marcur | 210/759 |

OTHER PUBLICATIONS

R. E. Wing, "Treatments for Complex and Chelated Rinsewaters," pp. 3, 4 and 19, Part of a Short Course Sponsored by AESF, Jan. 1988.
R. E. Wing, "Emerging Treatment Technologies for Removing Metals," pp. 9–15, Part of a Short Course Sponsored by AESF, Jan. 1988.
R. E. Wing et al., "Treatment of Complex Copper Rinsewater with Insoluble Starch Xanthate," Plating and Surface Finishing 65:52 (Dec. 1978).

Primary Examiner—Robert L. Stoll
Assistant Examiner—Steven J. Bos
Attorney, Agent, or Firm—Ann W. Speckman

[57] ABSTRACT

Removal of dissolved copper from solution according to the present invention involves treatment of waste solutions such as electroless copper overflow solutions with aluminum particles under reaction conditions promoting precipitation of dissolved copper from solution as metallic copper. Copper plating solutions having high concentrations of dissolved copper are inactivated in overflow reservoir (12) by addition of an inactivating agent from reservoir (14) to prevent plating of metallic copper onto vessels and conduits during collection, storage and/or transport of the solution. Inactivation of the copper plating solution is followed by precipitation of dissolved copper from solution as metallic copper in reaction vessel (20) by addition of aluminum particles from reservoir (24). Reducing agent and caustic agent may also be added to the reaction vessel from reservoirs (22) and (26), respectively, to yield a purified solution which is substantially free of dissolved copper and suitable for discharge after pH adjustment.

19 Claims, 1 Drawing Sheet

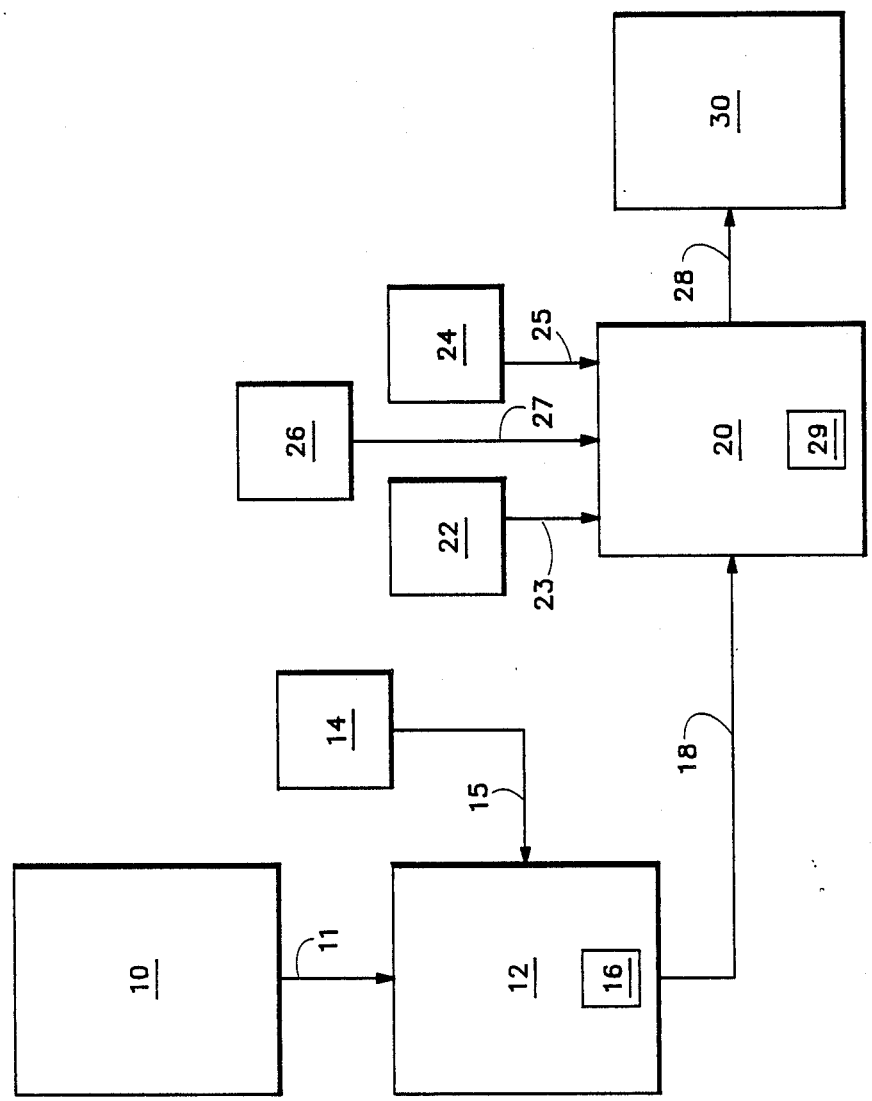

PROCESS FOR REMOVAL OF DISSOLVED COPPER FROM SOLUTION

TECHNICAL FIELD

The present invention relates to a process for treatment of waste solutions providing improved removal of dissolved copper from solution. The present invention is especially suitable for treatment of an electroless copper waste solution providing substantially complete removal of dissolved copper from solution.

BACKGROUND OF THE INVENTION

Electroless copper solutions are commonly used in the electronics industry for depositing metallic copper on substrates such as circuit boards without application of external electrical current. Circuit boards are typically immersed in an electroless copper solution wherein, by means of oxidation-reduction reactions, metallic copper is uniformly deposited on surfaces of the hole walls, thus producing a circuit board having plated through holes (PTH). This provides electrical continuity from one surface of the circuit board to the other. The electroless copper solution is maintained at an elevated pH level under reaction conditions which promote reduction of cupric ions in solution to metallic copper. Formaldehyde typically serves as the reducing agent. The metallic copper plating reaction in an electroless copper solution proceeds as follows:

$Cu^{++} + 2HCHO + 4OH^- \rightarrow Cu^0 + H_2 + 2HCOO^- + 2H_2O$ Uniformity of metallic copper deposition is critical to meet circuit board performance standards, since inconsistencies in metallic copper plating may result in defective circuit boards which are prone to failures. The electroless copper solution is therefore frequently or continuously replenished to maintain adequate concentrations of reactants for continuous uniform plating of metallic copper. Since the chemistry of the electroless copper solution is maintained substantially constant, overflow electroless copper solutions contain high levels of dissolved copper and formaldehyde.

Dissolved copper concentrations in discharge solutions are strictly regulated, and electroless copper overflow solutions must be processed to remove substantially all dissolved copper from solution before they can be discharged to the environment. Waste streams comprising dissolved copper are considered hazardous wastes, and they must be handled and disposed of with great care. In many facilities, electroless copper waste is contained and transported to a remote site for disposal. Handling, transport and disposal of electroless copper waste streams as a hazardous waste material involves substantial expense.

Several processes for removal of dissolved copper from solution are known in the art. For example, dithiocarbamates, (DTC) such as sodium dithiocarbamate, are known as metal scavengers and have been used to remove copper and other soluble metals from solution. Most effective metal removal using DTC is achieved when the total metal concentration is in excess of 10 mg/L. DTC is generally available commercially in the form of dimethyl or diethyl derivatives. Insoluble starch xanthate has also been employed in processes for removal of dissolved copper for example, from industrial alkaline rinses and industrial ammonium persulfate copper etchant rinses.

Sodium borohydride ($NaBH_4$) has been utilized to remove metals from solution by reducing the metal ions to a lower valence state or to the free metal. Metals may redissolve in solution unless the precipitated metals are removed quickly, however, and further wastewater treatment is necessary to remove borate from solution. Sodium hydrosulfite has also been employed as a reducing agent for metal removal from chelated systems. In general, processes for removal of dissolved copper from solutions containing high concentrations of dissolved copper may be prohibitively expensive to operate, require specialized equipment, or involve multiple process stages.

The metallic copper plating reaction may be permitted to proceed so that dissolved copper in electroless copper waste streams is eliminated simply by plating out of solution as metallic copper. This process involves significant inconvenience, however, and it is difficult to control. Electroplating techniques may likewise be implemented to remove dissolved copper from electroless copper baths. Electroplating processes typically require pH adjustment prior to the application of an electrical current. Dissolved copper may be removed from electroless copper rinses by adjusting the pH of solution and passing the dissolved copper rinse solution through an ion exchange column which provides selective removal of dissolved copper. Treatment of electroless copper overflow solutions in ion exchange columns is ineffective, however, due to the significantly higher concentrations of dissolved copper. Accordingly, it is an objective of the present invention to provide a process for removal of dissolved copper from solution which provides substantially complete copper removal and improved process efficiency.

It is another objective of the present invention to provide a process for removal of substantially all dissolved copper from waste streams having dissolved copper concentrations of up to several thousand ppm.

It is still another objective of the present invention to provide a process for precipitation of dissolved copper from electroless copper waste streams as metallic copper which may be partitioned from the purified liquid.

It is yet another objective of the present invention to provide a process for removal of dissolved copper from solution which is easily implemented without requiring substantial equipment, chemical, energy or supervisory requirements.

DISCLOSURE OF THE INVENTION

Removal of dissolved copper from aqueous waste streams according to the present invention involves treatment of aqueous waste streams with aluminum particles under reaction conditions promoting precipitation of dissolved copper as metallic copper. The chemical reaction for removal of dissolved copper by reaction with aluminum particulates is as follows:

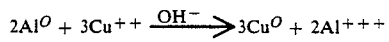

In addition to the chemical reaction whereby dissolved copper is converted to metallic copper and metallic aluminum particulates are solubilized, plating of metallic copper onto the aluminum particulates may also take place in accordance with the copper plating reaction. Precipitation and plating of metallic copper according to the process of the present invention may be accelerated by addition of a reducing agent, such as formaldehyde. Addition of formaldehyde, or another suitable reducing agent drives the equilibrium of the copper removal equation to the right and prevents metallic copper precipitated out of solution from dissolving. The process of the present invention provides substantially complete removal of dissolved copper from waste streams having copper concentrations of from less than 1 ppm to several thousand ppm.

Another aspect of the process of the present invention provides inactivation of copper plating solutions having high concentrations of dissolved copper during collection, storage and/or transport of the solution. Inactivation of solutions containing high levels of dissolved copper prevents copper from being deposited as metallic copper on surfaces of collection, storage and/or transport vessels and conduits. Dissolved copper in solutions such as electroless copper overflow solutions will otherwise plate out as metallic copper on the surfaces of vessels and conduits at a rapid rate. If the plating reaction is allowed to proceed, conduits become constricted and ultimately clog due to deposition of metallic copper, and conduits and reaction vessels must be replaced at frequent intervals. Addition of a copper plating inactivating agent according to the present invention prevents deposition of metallic copper on the surfaces of vessels and conduits, yet the reaction may be reversed if necessary during the dissolved copper precipitation and removal phase of the treatment process.

BRIEF DESCRIPTION OF THE DRAWINGS

The above-mentioned and additional features of the present invention and the manner of obtaining them will become apparent, and the invention will be best understood by reference to the following more detailed description read in conjunction with the accompanying drawing, which shows a schematic flow diagram illustrating the process of the present invention for removal of dissolved copper from solution.

DETAILED DESCRIPTION OF PREFERRED EMBODIMENT

The figure schematically illustrates a preferred embodiment of the process of the present invention providing inactivation of a copper plating solution in a first process phase followed by precipitation of soluble copper from solution as metallic copper in a second process phase, to yield a purified solution which is substantially free from dissolved copper and suitable for discharge after pH adjustment. The two treatment phases of the present invention may be utilized independently of one another or in conjunction with other wastewater treatment processes, but they are preferably utilized in combination to provide a comprehensive dissolved copper removal process.

The process of the present invention is useful for precipitating dissolved copper from various types of waste solutions having dissolved copper concentrations of less than 1 ppm to several thousand ppm. It is especially suitable for use in treating electroless copper waste solutions having high dissolved copper concentrations, and preferred embodiments of the process of the present invention will be illustrated and described with reference to electroless copper waste solutions. Electroless copper bath overflow solutions typically have a dissolved copper concentration of about 1500 to about 2500 ppm, and preferred reaction parameters for the process of the present invention are described with reference to treatment of solutions having a dissolved copper concentration of about 1500 to 2500 ppm. The process of the present invention is however, adaptable for treatment of waste solutions having higher or lower dissolved copper concentrations.

Electroless copper overflow solution is withdrawn from electroless copper bath 10 and conveyed through electroless copper overflow conduit 11 to electroless copper overflow reservoir 12 for first phase treatment to inactivate the copper plating solution. A strong reducing agent, typically formaldehyde, is present in the electroless copper bath solution to promote plating of metallic copper by reduction of cupric ions in solution. Unless the reducing agent is inactivated or removed from solution, reduction of cupric ions and plating of metallic copper will continue until the reactants are consumed.

Inactivation of the copper plating solution preferably takes place in proximity to electroless copper bath 10 to reduce deposition of metallic copper on the inner surfaces of overflow conduit 11. Metallic copper plating inactivating agent is introduced into electroless copper overflow reservoir 12 from inactivating agent reservoir 14 through supply conduit 15. Where the electroless copper bath comprises formaldehyde as a reducing agent, the inactivating agent preferably comprises an oxidizing agent, such as hydrogen peroxide, or the like. Hydrogen peroxide is the preferred oxidizing agent for inactivating formaldehyde in electroless copper solutions according to the following chemical reaction:

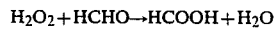

$$H_2O_2 + HCHO \rightarrow HCOOH + H_2O$$

Hydrogen peroxide is preferably introduced in an amount sufficient to oxidize substantially all formaldehyde in the electroless copper solution. Molar ratios of about 1:1 (hydrogen peroxide:formaldehyde) are preferred to achieve substantially complete oxidization of formaldehyde in solution, yet to prevent accumulation of oxidizing agent in solution.

Mixing means 16 is positioned within electroless copper overflow reservoir 12 to provide substantially complete mixing of electroless copper overflow solution with inactivating agent. Various types of mixing means may be employed, such as mechanical mixing means, baffles or other mechanical impediments providing enhanced liquid flow and mixing, or other liquid disruption means such as gas sparging systems. Use of an air sparging system to provide substantially complete mixing within electroless copper overflow reservoir 12 is preferred. Retention times of at least about 30 seconds are suitable to provide substantially complete oxidation of formaldehyde to effectively inactivate the electroless copper overflow solution, thereby preventing deposition of metallic copper. Continuous or intermittent introduction of electroless copper waste solution into reservoir 12 is preferably accompanied by continuous or intermittent addition of inactivating agent to the reservoir. One preferred method for monitoring the inactivation reaction is to monitor the temperature of solution in the electroless copper overflow reservoir. The inactivation reaction which takes place between the reducing agent and the oxidizing agent, is an exothermic reaction, and the temperature of inactivated solution in the overflow reservoir is consistently higher than that of the electroless copper bath.

Inactivation of the electroless copper overflow solution prevents deposition of metallic copper on the surfaces of reaction vessels and conduits and thereby facilitates transport and downstream processing of the electroless copper overflow solution. Inactivation of electroless copper solution may be employed as a pretreatment stage for a variety of electroless copper removal processes, or it may be utilized in connection with transport and disposal of waste streams containing high levels of dissolved copper. It is preferably used in combination with the dissolved copper removal process described in detail below to provide substantially complete removal of dissolved copper from solution in a simplified and efficient process.

Inactivated electroless copper overflow solution is discharged from reservoir 12 and conveyed through treatment conduit 18 to reaction vessel 20, wherein dissolved copper is reacted with metallic aluminum particles to yield metallic copper which may be partitioned from solution. Metallic aluminum particles also react in the basic electroless copper waste solution to generate hydrogen gas, and reaction vessel 20 is suitably vented to provide release of gases generated during the copper precipitation reaction.

Aluminum particles are introduced into reaction vessel 20 from aluminum particle reservoir 24 through supply conduit 25. Aluminum powder having a purity of at least about 95% and an average particle size of less than about 100 microns is preferred for use in the process of the present invention. Aluminum powder having a purity of at least about 97.5% and average particle sizes of less than about 60 microns is especially preferred. Suitable aluminum powder is commercially available, for example as Valimet Grade M-2 from Valimet, Inc., Stockton, CA 95206. Aluminum fines having a larger average particle size and/or a lower purity may be substituted for high purity aluminum powder, but the process parameters and results may be less predictable.

Removal of dissolved copper from solution by addition of aluminum particulates is preferably carried out in a batch mode fashion. Aluminum particulates are introduced into and mixed with the electroless copper overflow solution in reaction vessel 20 in an amount sufficient to cause substantially complete precipitation of dissolved copper from solution. At least stoichiometric quantities of aluminum are introduced to react with substantially all dissolved copper in solution. Suitable quantities of high purity aluminum powder providing precipitation of substantially all dissolved copper in solution generally range from about 0.5 to about 4.0 g/L electroless copper solution, with about 1.0 to 1.5 g/L electroless copper solution being especially preferred. Experimental results have indicated that aluminum concentrations of at least about 0.5 g/L electroless copper solution may be required for copper removal to proceed within acceptable reaction times. Lower aluminum concentrations may be used under certain circumstances, but longer copper removal reaction times may be required. When larger aluminum particles having a lower purity are used, larger quantities may be necessary to provide substantially complete precipitation of dissolved copper from solution.

Mixing means 29 is positioned within reaction vessel 20 to provide substantially complete mixing of electroless copper overflow solution with aluminum particulates. Various types of mixing means may be employed, such as mechanical mixing means, arrangement of baffles or the like within the reaction vessel to provide enhanced liquid flow and mixing, or other liquid disruption means such as gas sparging systems. Retention times of about 20 to about 70 minutes are suitable at temperatures of about 23° C., and retention times of about 30 to about 60 minutes at temperatures of about 23° C. result in substantially complete precipitation of dissolved copper under most circumstances. Precipitation of metallic copper according to the process of the present invention is highly temperature dependent and, when the reaction is carried out at temperatures below about 23° C., longer reaction times may be required. Likewise, if precipitation of metallic copper from solution according to the present invention is carried out at temperatures above 23° C., shorter retention times may suffice.

When copper removal by precipitation with aluminum particulates is used in combination with a first phase inactivation process of the type described above, a dissolved copper activating agent may be required to achieve substantially complete precipitation of dissolved copper from electroless copper overflow solution. Addition of a dissolved copper activating agent such as formaldehyde to electroless copper reaction vessel 20 facilitates the precipitation and/or plating of dissolved copper in solution as metallic copper and prevents metallic copper precipitated out of solution from redissolving. Addition of formaldehyde as an activating agent may be necessary to accelerate and/or sustain precipitation of dissolved copper from solution as metallic copper particularly where aluminum fines or particles having larger average particle sizes and/or lower purity than the preferred aluminum powder are used as the source of aluminum particles.

As shown in the drawing, activating agent, such as formaldehyde, may be supplied to reaction vessel 20 from reservoir 22 through supply conduit 23. Addition of about 5.0 to about 16.0 ml 37% formaldehyde/L to the inactivated electroless copper solution is suitable, where necessary, to activate the previously inactivated electroless copper solution. Formaldehyde is a component of the activated electroless copper bath solution, and it is desired to restore the formaldehyde component of the electroless copper bath solution to its initial concentration. Activating agent is preferably added to and mixed with the electroless copper solution prior to addition of aluminum particles. Where the activating agent has not previously been inactivated as described above with reference to the first reaction phase, addition of an activating agent is generally unnecessary to facilitate precipitation of copper from solution.

Addition of a caustic agent may also be necessary to sustain and/or accelerate precipitation of dissolved copper from solution as metallic copper when the electroless copper solution has been treated in a first phase inactivation process. Caustic agent is also preferably added to and mixed with the electroless copper solution prior to addition of aluminum particles. As shown in the drawing, caustic agent, such as sodium hydroxide, potassium hydroxide or the like may be supplied to reaction vessel 20 from reservoir 26 through supply conduit 27. Addition of caustic agent in quantities which would elevate the caustic concentration in the waste solution being treated to the caustic concentration of the original electroless copper bath solution in its activated form is preferred. In general, higher concentrations of caustic in the solution may substantially accelerate the removal of copper from solution, but increased quantities of gases are generated and the reaction parameters are less predictable and controllable.

When dissolved copper has been substantially completely precipitated from electroless copper waste solution by reaction with aluminum particles in reaction vessel 20, the liquid/solids mixture is withdrawn from reaction vessel 20 through liquid/solids withdrawal conduit 28 and conveyed to liquid/solids separation means 30. Liquid/solids separation means 30 preferably comprises a filtration device having a pore size of about 10 microns or less. Filtration devices having a pore size of about one micron are especially preferred. Various types of liquid/solids separation means are well known in the art and would be suitable for use in the process of the present invention, such as filter columns employing wound cartridges.

Metallic copper precipitated from electroless copper solution by reaction with aluminum particles is thus collected in liquid/solids separation means 30, as are unreacted aluminum particles and particles having metallic copper deposited thereon. Filtration is preferably carried out in a closed vessel, or the filtration device is preferably continuously submersed in the solution being treated to prevent reaction of precipitated metallic copper with air. Metallic copper which has been filtered out of solution may otherwise react with air to form copper oxides which may redissolve upon contact with solution and elute as dissolved copper with the solution. Liquid/solids separation means 30 preferably provides substantially complete removal of solids from solution.

Liquids are discharged from liquid/solids separation means 30 and conveyed through liquid conduit 31 to neutralization reaction vessel 32. The waste solution typically has an elevated pH and cannot be discharged from the environment without pH adjustment. Neutralizing agent is supplied to neutralization reaction vessel 32 from neutralizing agent supply reservoir 34 through supply conduit 35. Mixing means 36 is positioned within neutralization reaction vessel 32 to provide substantially complete mixing of liquid with neutralizing agent. Suitable neutralizing agents such as sulfuric acid and other acids are well known in the art, and are preferably introduced in quantities sufficient to reduce the pH of solution to about 6.5 to 9.0. Neutralized solution which is substantially free of dissolved copper is then withdrawn from neutralization reaction vessel 32 through liquid discharge conduit 38 for disposal or productive use.

The process of the present invention has been described with reference to a schematic flow diagram, and it will be recognized that certain mechanical devices which have not been illustrated, such as liquid pumps, metering pumps, liquid and/or solids flow meters and controllers, pH meters, and the like may be provided as necessary to achieve the stated process objectives. In addition, automated control mechanisms may be incorporated so that the process proceeds in an automated fashion, requiring minimal manual monitoring and supervision.

The process of the present invention may be employed to reduce dissolved copper levels in solution to less than about 5 ppm, and preferably to less than about 1 ppm. Purified wastewater discharged from a manufacturing or treatment facility preferably has a dissolved copper concentration of about 1 ppm or less. Dissolved copper concentrations of about 5 ppm in treated electroless copper waste solution are acceptable, however, if the solution is diluted with wastewater from other sources which contain minute quantities of dissolved copper. Although additions of chemical reagents according to the process of the present invention may require adjustment depending on the concentration of dissolved copper in solution, electroless copper baths generally have substantially constant chemistry, so that once initial adjustments are made, the process typically proceeds without substantial modification.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A process for removing dissolved copper from a solution comprising dissolved copper and reducing agent, the process comprising: reversibly inactivating the dissolved copper in solution by inactivating said reducing agent; precipitating dissolved copper from the solution by mixing the solution with aluminum particles after inactivating the dissolved copper; and separating metallic copper from the solution, thereby producing a treated solution having reduced levels of dissolved copper.

2. A process according to claim 1, wherein said aluminum particles have a purity of about 95% and an average particle size of less than about 100 microns.

3. A process according to claim 2, wherein said aluminum particles have a purity of about 97.5% and an average particle size of less than about 60 microns.

4. A process according to claim 1, wherein said aluminum particles are mixed in at least stoichiometric quantities with dissolved copper in the solution.

5. A process according to claim 1, wherein said aluminum particles are provided in quantities of about 0.5 g/L solution to about 4.0 g/L solution.

6. A process according to claim 5, wherein said aluminum particles are provided in quantities of about 1.0 g/L solution to 1.5 g/L solution.

7. A process according to claim 1, wherein said mixing of the solution with said aluminum particles is continued for retention times of about 30 to about 60 minutes.

8. A process according to claim 1, wherein said mixing of the solution with said aluminum particles is carried out at temperatures of about 23° C.

9. A process according to claim 1, additionally comprising introducing a caustic agent to said treated solution and reducing the pH of said treated solution to about 6.5 to 9.0.

10. A process according to claim 1, wherein said inactivating of said reducing agent in solution is achieved by introducing an oxidizing agent to the solution.

11. A process according to claim 10, wherein said reducing agent is formaldehyde and said oxidizing agent is hydrogen peroxide.

12. A process according to claim 11, wherein said hydrogen peroxide is introduced to the solution in molar ratios of about 1:1 with said formaldehyde.

13. A process according to claim 10, additionally comprising reactivating the dissolved copper in solution during said mixing of the solution with said aluminum particles.

14. A process according to claim 13, wherein said reactivating of the dissolved copper in solution is achieved by introducing a reducing agent to the solution.

15. A process according to claim 14, wherein said reactivating of the dissolved copper in solution additionally includes introducing a caustic agent to the solution.

16. A process according to claim 15, wherein said reducing agent comprises formaldehyde and said caustic agent comprises sodium hydroxide.

17. A process according to claim 1, wherein the solution comprises an electroless copper bath solution.

18. A process for inactivating an electroless copper waste solution comprising dissolved copper and a reducing agent comprising:
   inactivating the reducing agent by mixing the electroless copper solution with an oxidizing agent in an amount sufficient to achieve molar ratios of about 1:1 with the reducing agent.

19. A process according to claim 18, wherein said reducing agent is formaldehyde and said oxidizing agent is hydrogen peroxide.

* * * * *